United States Patent [19]
Kovar

[11] 3,710,872
[45] Jan. 16, 1973

[54] GROUND ENGAGING IMPLEMENT TOOTH AND MOUNTING MEANS THEREFOR

[75] Inventor: Henry L. Kovar, Anoka, Minn.
[73] Assignee: John R. Kovar Mfg. Co., Inc., Anoka, Minn.
[22] Filed: Aug. 11, 1970
[21] Appl. No.: 62,819

[52] U.S. Cl. ................................ 172/707, 56/400
[51] Int. Cl. ..................... A01b 23/02, A01d 77/00
[58] Field of Search ...... 172/705, 707, 624, 627, 763; 56/400, 400.21

[56] References Cited

UNITED STATES PATENTS

| | | | |
|---|---|---|---|
| 2,158,299 | 5/1939 | Oppenheim | 56/400 |
| 2,502,769 | 4/1950 | Warnke | 56/400 |
| 1,099,150 | 6/1914 | MacPhail | 56/400 |
| 671,288 | 4/1901 | MacPhail | 56/400 |
| 2,482,883 | 9/1949 | Thomas | 56/400 |

Primary Examiner—Robert E. Pulfrey
Assistant Examiner—Stephen C. Pellegrino
Attorney—Zarley, McKee & Thomte

[57] ABSTRACT

A ground engaging implement tooth and mounting means therefor comprising an elongated rod element having opposite ends and having a portion of its length adjacent one end formed into a coil having a plurality of convolutions disposed on a horizontal axis. The end of the rod adjacent the coil terminates in an anchor portion which is adapted to be secured to an implement frame by means of an anchor bolt extending therethrough. The other end of the rod extends away from the last convolution on the other end of the coil in a vertical direction to form a straight ground engaging portion. The convolutions of the coil decrease in diameter from the anchor portion to the ground engaging portion so that deflection of the ground engaging portion will tend to be resiliently absorbed in the coil by more than the last convolution thereof and so that the ground engaging portion will normally be free from engagement with an implement frame upon deflection of the ground engaging portion.

4 Claims, 10 Drawing Figures

PATENTED JAN 16 1973 3,710,872
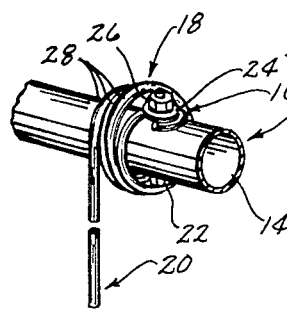
Fig. 1
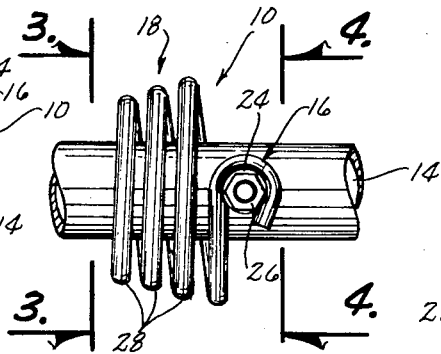
Fig. 2
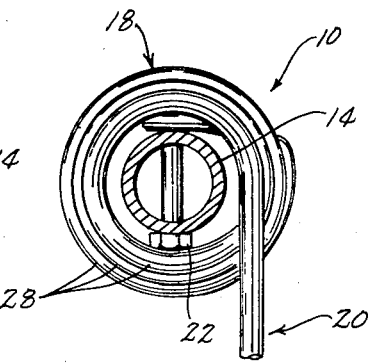
Fig. 3
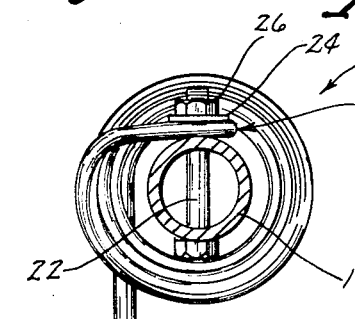
Fig. 4
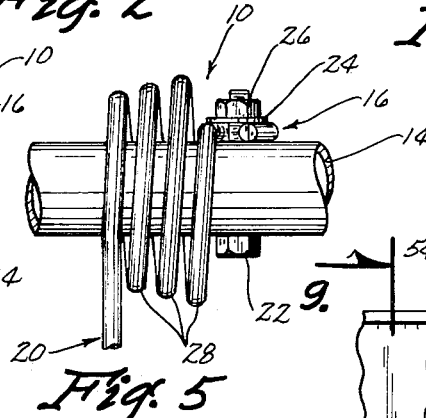
Fig. 5
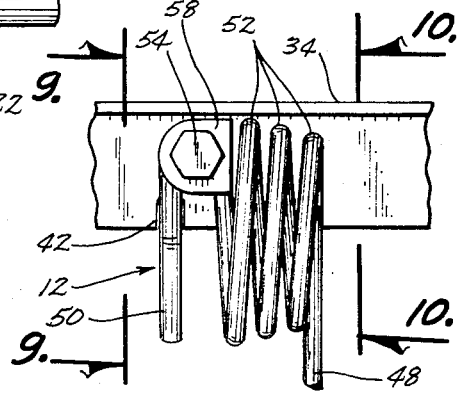
Fig. 8
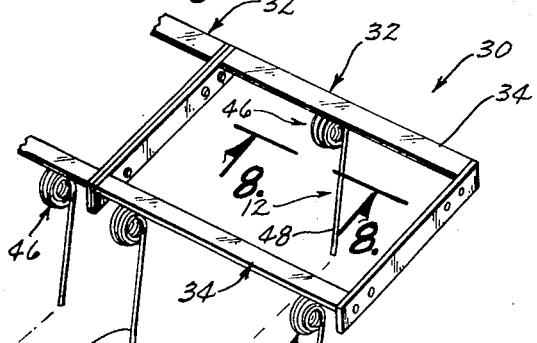
Fig. 6
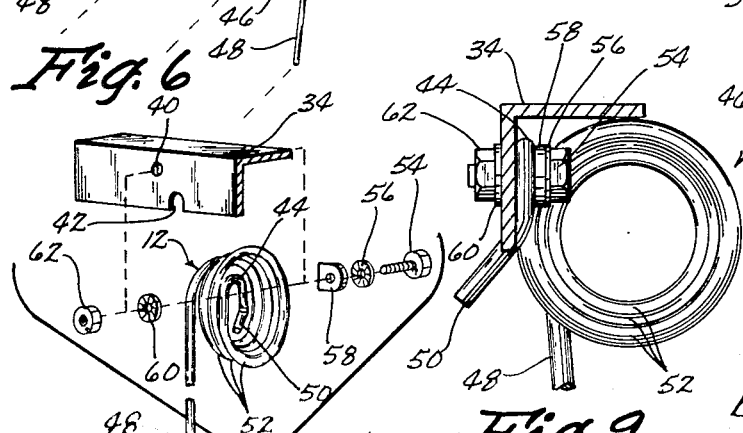
Fig. 7
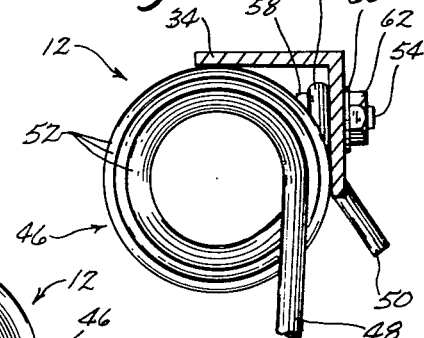
Fig. 10
Fig. 9
INVENTOR
HENRY L. KOVAR
BY
Zarley, McKee & Thomte
ATTORNEYS

GROUND ENGAGING IMPLEMENT TOOTH AND MOUNTING MEANS THEREFOR

Conventional ground engaging implement teeth of the coil spring type comprise generally a coil including a plurality of closely positioned convolutions which progressively increase in diameter from their attachment end to their other end from which extends the ground engaging tooth portion. The attachment end of the coil is secured to an implement frame and deflection of the ground engaging tooth portion causes the ground engaging tooth portion to engage the frame. Deflection of the ground engaging tooth portion also causes the largest convolution of the coil to engage the frame. The engagement of the ground engaging tooth portion and the largest convo-lution of the coil with the frame decreases the efficiency of the tooth and also causes damage to the tooth. Further, the fact that the convolutions are in engagement with each other causes a heat build-up in the coil which can cause failure to the tooth.

Therefore, it is a principal object of this invention to provide a ground engaging implement tooth and mounting means therefor.

A further object of this invention is to provide a ground engaging implement tooth comprising a coil having a plurality of convolutions disposed on a horizontal axis and which progressively decrease in diameter from their attachment end to their other end from which extends the ground engaging tooth portion.

A further object of this invention is to provide a ground engaging implement tooth including a coil comprised of a plurality of spaced apart convolutions.

A further object of this invention is to provide a ground engaging implement tooth and mounting means therefor wherein the ground engaging tooth portion is free to deflect in 360° fashion.

A further object of this invention is to provide a ground engaging implement tooth which prevents the ground engaging tooth portion thereof from engaging the implement frame member to which the tooth is attached.

A further object of this invention is to provide a ground engaging implement tooth and mounting means therefor which insures that the tooth will operate with the utmost efficiency.

A further object of this invention is to provide a ground engaging implement tooth and mounting means therefor which prevents the tooth from inadvertently moving with respect to the implement frame.

A further object of this invention is to provide a ground engaging implement tooth and mounting means therefor which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a partial perspective view illustrating an implement frame member having one form of the tooth mounted thereon.

FIG. 2 is a top view of the device of FIG. 1.

FIG. 3 is a sectional view seen along lines 3—3 of FIG. 2.

FIG. 4 is a sectional view seen along lines 4—4 of FIG. 2.

FIG. 5 is a rear view of the device of FIGS. 1-4.

FIG. 6 is a partial perspective view illustrating a second form of the tooth secured to an implement frame.

FIG. 7 is an exploded perspective view of the tooth of FIG. 6 and the frame member to which it is secured.

FIG. 8 is an enlarged view seen along lines 8—8 of FIG. 6.

FIG. 9 is a sectional view seen along lines 9—9 of FIG. 8.

FIG. 10 is a sectional view seen along lines 10—10 of FIG. 8.

In FIGS. 1-5, the numeral 10 refers generally to one form of the implement tooth while the numeral 12 designates a second form of the tooth seen in FIGS. 6-10. Tooth 10 is designed to be secured to a horizontally disposed implement frame member 14 having a pipe configuration. The longitudinal axis of frame member 14 is disposed transversely with respect to the direction of the travel of the implement. Tooth 10 is comprised of an elongated rod element formed so as to define an anchor or loop portion 16, coil portion 18 and ground engaging tooth portion 20. Anchor portion 16 is secured to frame member 14 by means of an anchor bolt 22 which extends upwardly through frame member 14, through anchor portion 16 and through flat washer 24. Nut 26 maintains bolt 22 on frame member 14.

Anchor portion 16 is positioned at the upper end of frame member 14 with frame member 14 extending through the coil portion 18 as seen in the drawings. Anchor portion 16 is substantially horizontally tangentially disposed with respect to the upper end of frame member 14. Coil portion 18 is comprised of a plurality of spaced apart convolutions 28 which are disposed on a horizontal axis. As seen in the drawings, the convolutions 28 of coil portion 18 decrease in diameter from the anchor portion 16 to the ground engaging tooth portion 20. Tooth portion 20 extends substantially vertically downwardly from the rearward end of the frame member 14 as best seen in FIG. 3.

In operation, the fact that the convolutions 28 are spaced from each other prevents heat build-up in the coil portion to prevent failure of the tooth. Deflection of the ground engaging tooth portion 20 tends to be resiliently absorbed in the coil 18 by more than the convolution 28 adjacent tooth portion 20 due to the fact that the convolutions 28 of the coil decrease in diameter from the anchor portion 16 to the ground engaging portion 20. The design of the coil 18 also prevents the ground engaging portion 20 from engaging the implement frame 14 upon deflection of the ground engaging tooth portion 20. The efficiency of the tooth is greatly enhanced by preventing engagement of the ground engaging tooth portion 20 with the frame member which also prevents damage to the tooth. The ground engaging tooth portion 20 is free to deflect in a 360° fashion without engaging the frame member 14 thereby insuring maximum efficiency for the tooth.

An implement frame means is depicted in FIG. 6 and generally designated by the reference numeral 30 comprised of individual frame sections 32 which may be bolted together in an end-to-end fashion. Frame sections 32 comprise angular frame members 34 which are spaced apart and which are disposed transversely to the direction of travel of the implement. Frame member 34 includes a horizontal flange 36 and a vertical flange 38 which extends downwardly from the forward end thereof as seen in FIG. 9. Vertical flange 38 is provided with a bolt opening 40 formed therein and a notch 42 which extends upwardly into the lower end thereof laterally of the bolt opening 40. Tooth 12 generally comprises an anchor or loop portion 44, coil portion 46 and ground engaging tooth portion 48. Tooth 12 is provided with an end portion 50 which extends downwardly and forwardly from loop portion 44 as seen in FIGS. 7 and 9 and which is adapted to be received in the notch 42 when the tooth is mounted on the frame member 34. Coil portion 46 is comprised of a plurality of spaced apart convolutions 52 which decrease in diameter from anchor portion 44 to ground engaging tooth portion 48 and are disposed on a horizontal axis.

Tooth 12 is secured to frame member 34 by means of an anchor bolt 54 extending horizontally forwardly through lock washer 56, flat plate 58, anchor portion 44, bolt opening 40 and through lock washer 60. Nut 62 is threadably mounted on the bolt 54 to maintain the tooth 12 on frame member 34. With tooth 12 secured to frame member 34, end portion 50 extends through notch 42 and prevents anchor portion 44 from rotating with respect to the anchor bolt 54 during operation of the implement. As seen in FIG. 10, the convolution 52 which is adjacent the anchor portion 44 is substantially vertically tangentially disposed with respect to vertical flange 38 and is spaced slightly rearwardly thereof. Ground engaging tooth portion 48 extends substantially vertically downwardly from the convolution having the smallest diameter so that the tooth portion 48 is substantially spaced from the frame member 34 thereby insuring that the tooth portion 48 will not engage the frame member 34 upon deflection thereof. The elimination of the engagement of the ground engaging tooth portion 48 with the frame member insures that the tooth will operate with the utmost in efficiency and insures that the tooth will not become damaged. The fact that the tooth portion 48 extends from the convolution having the smallest diameter results in deflection in the ground engaging tooth portion 48 to be resiliently absorbed in the coil 46 by more than the convolution adjacent the tooth portion 48. Tooth portion 48 is free to deflect in a 360° fashion without engaging the frame member. It has been found that tooth 12 is more rigidly maintained on the frame member 34 when the flat plate 58 is positioned adjacent the anchor portion 44 and a pair of lock washers are used on the anchor bolt.

In each of the embodiments disclosed herein, the ground engaging tooth portion extends vertically downwardly from the smallest convolution of the coil to prevent the ground engaging tooth portion from engaging the frame member upon deflection of the ground engaging tooth portion. Heat build-up is prevented in the coil by spacing the individual convolutions of the coil thereby preventing failure of the tooth. Furthermore, the extension of the tooth from the smallest of a series of convolutions decreasing in diameter permits the deflection of the tooth to be more uniformly spread over the coil instead of only a single convolution, thus enhancing the useful life of the tooth. Thus, it can be seen that the teeth of this invention accomplish at least all of their stated objectives.

I claim:

1. In combination, an implement frame and a ground engaging implement tooth, comprising, an elongated rod element having opposite ends and having a portion of its length adjacent one end formed into a coil having a plurality of convolutions on a horizontal axis, the end of said rod adjacent said coil terminating in an anchor portion, the other end of said rod extending away from the last convolution on the other end of said coil in a vertical direction to form a straight ground engaging portion, the convolutions of said coil decreasing in diameter from said anchor portion to said ground engaging portion, an implement frame member, and means securing said anchor portion to said frame member so that said ground engaging portion is completely spaced from said frame member so that said ground engaging portion and said frame member will be free from engagement with each other during any normal operational deflection of said ground engaging tooth portion, said frame member having horizontal and vertical flanges, said anchor portion being secured to said vertical flange, said ground engaging portion being free from engagement with said horizontal and vertical flanges, said anchor portion being comprised of a loop portion which is adapted to receive an anchor bolt to secure said anchor portion to said vertical flange, said anchor bolt extending through said loop portion and through a bolt opening formed in said vertical flange, said vertical flange having a notch formed in its lower end positioned laterally of said bolt opening, said loop portion having an end portion which is received by said notch to normally maintain said plurality of convolutions on a horizontal axis.

2. The combination of claim 1 wherein said horizontal flange has forward and rearward ends and said vertical flange has rearward and forward sides with respect to the direction of travel of said implement frame, said vertical flange extending downwardly from the forward end of said horizontal flange, said anchor portion being positioned at the rearward side of said vertical flange.

3. The combination of claim 2 wherein said loop portion has rearward and forward sides, said forward side of said loop portion being positioned in engagement with the rearward side of said vertical flange, a flat plate being positioned at the rearward side of said loop portion and having a bolt opening formed therein, a first lock washer positioned rearwardly of said flat plate, a second lock washer positioned at the forward side of said vertical flange, said anchor bolt extending forwardly through said first lock washer, said flat plate, said loop portion, said vertical flange, and said second lock washer to maintain said tooth on said frame member.

4. The combination of claim 2 wherein the convolution adjacent said loop portion extends therefrom vertically tangentially with respect to said vertical flange and normally free from engagement therewith.

* * * * *